Figure 1:
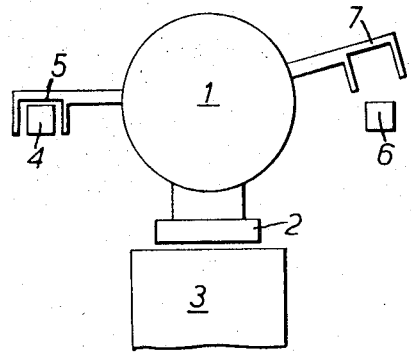

United States Patent [19]
Perrott

[11] 3,777,667
[45] Dec. 11, 1973

[54] TRANSPORTATION MEANS
[76] Inventor: Francis Cyril Perrott, The Manor House, South Cerney, Cirencester, England
[22] Filed: Oct. 19, 1971
[21] Appl. No.: 190,627

Related U.S. Application Data
[63] Continuation of Ser. No. 779,977, Nov. 29, 1968, abandoned.

[30] Foreign Application Priority Data
Aug. 21, 1968 Great Britain.................. 39,883/68

[52] U.S. Cl..................... 104/88, 104/130, 104/243
[51] Int. Cl........................... B61b 13/08, B61b 1/00
[58] Field of Search..................... 104/88, 105, 130, 104/245, 246, 247

[56] References Cited
UNITED STATES PATENTS

| | | | |
|---|---|---|---|
| 3,451,351 | 6/1969 | Hawes | 104/130 |
| 3,198,139 | 8/1965 | Dark | 104/148 LM |
| 3,098,454 | 7/1963 | Maestrelli | 104/247 |
| 3,234,891 | 2/1966 | Hampton et al. | 105/215 |
| 3,391,652 | 7/1968 | Lauber | 104/247 |
| 2,972,966 | 2/1961 | Bourdon | 104/247 |
| 3,113,529 | 10/1963 | Maestrelli | 104/247 |
| 3,254,608 | 6/1966 | Alden | 104/149 |
| 3,500,765 | 3/1970 | Easton et al. | 104/23 |

Primary Examiner—Gerald M. Forlenza
Assistant Examiner—Robert Saifer
Attorney—Irving S. Thompson

[57] ABSTRACT

Means of transportation comprise a vehicle and guidance means for the vehicle. The guidance means include a plurality of stationary guide members which respectively extend parallel to alternative routes for the vehicle, which routes either branch, or join, or both. A plurality of follower members are separately mounted on the vehicle and individually engageable with the guide members, and means carried by the vehicle enable any one of the follower members to be engaged with the corresponding guide member whereby to select and cause the vehicle to follow the route corresponding to the guide member engaged.

10 Claims, 18 Drawing Figures

PATENTED DEC 11 1973

3,777,667

SHEET 1 OF 6

INVENTOR
FRANCIS CYRIL PERROTT
BY Young & Thompson
ATTORNEYS

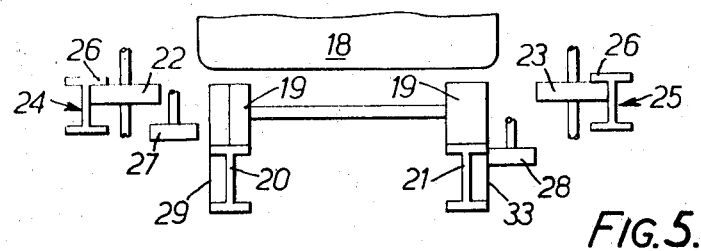
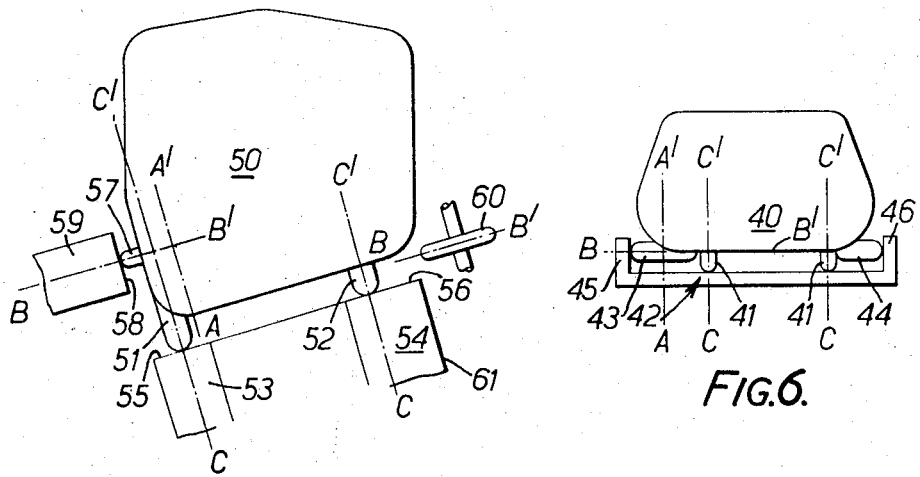
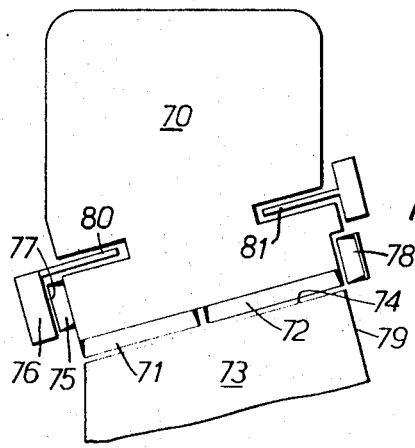

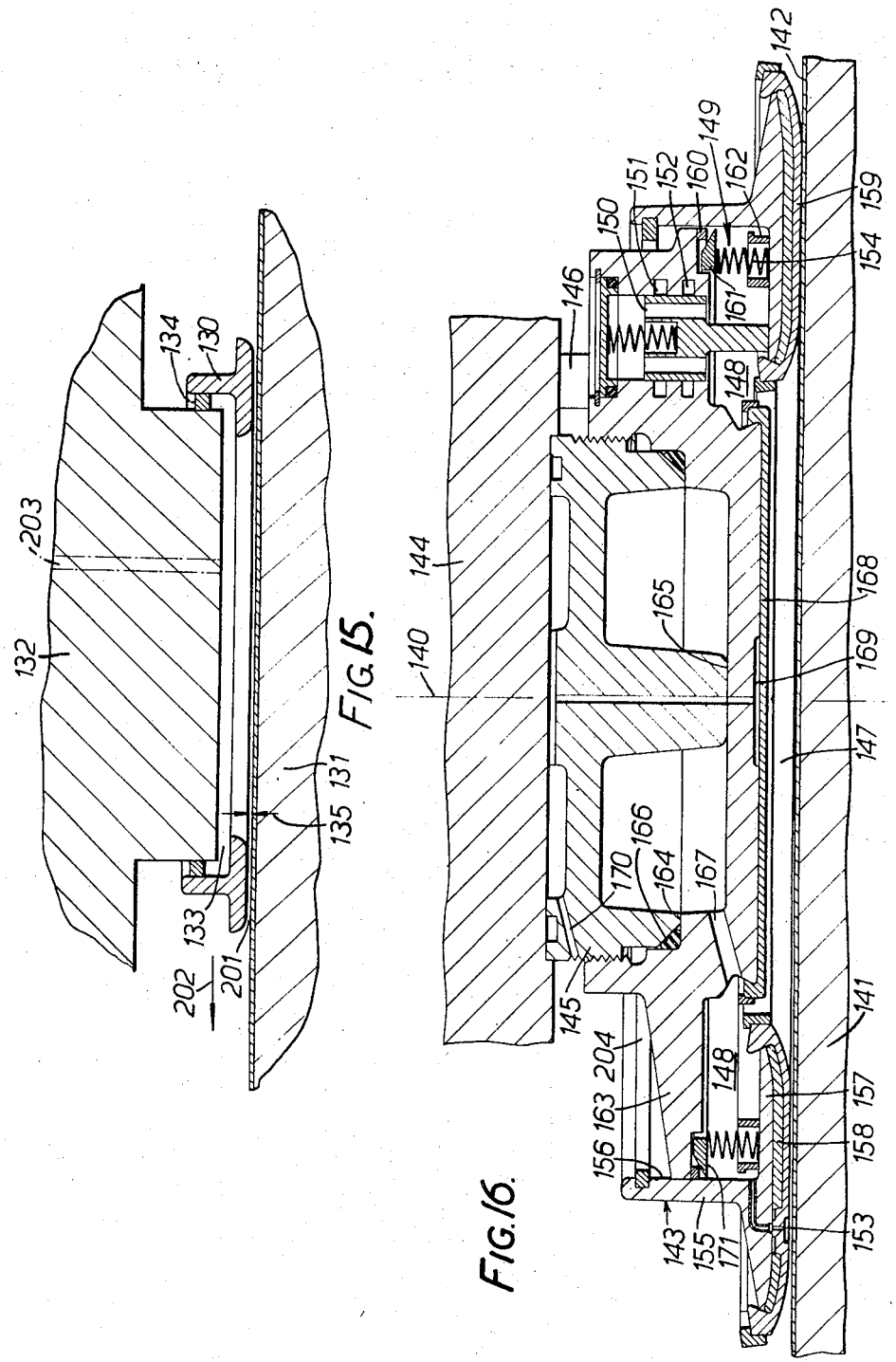

TRANSPORTATION MEANS

This is a continuation, of application Ser. No. 779,977, filed Nov. 29, 1968, now abandoned.

This invention relates to guided land transportation, and has for one of its objects to provide means of transportation in which stationary guide members respectively extend parallel to alternative track routes, and are selectively engageable by follower members mounted on a vehicle in order to select the route to be followed by the vehicle.

With common track guidance systems, such as in rail transport, vehicle position information is supplied to a stationary position, such as a signal box, and points, signals and the like are adjusted to meet estimated requirements.

The invention has for a further object to provide a track-guided vehicle in which the route-choice function is carried out by means carried by each vehicle itself, and in which points, track switches and the like are eliminated. Thus each vehicle selects its own route, preferably by means of a programming member carried by the vehicle.

Figure 3:
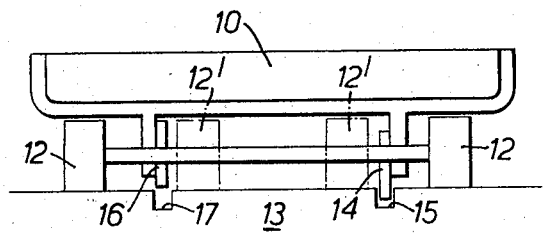
Figure 2:
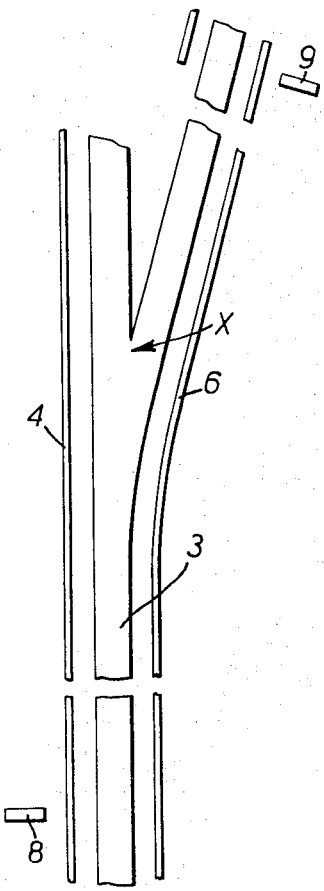
Figure 4:
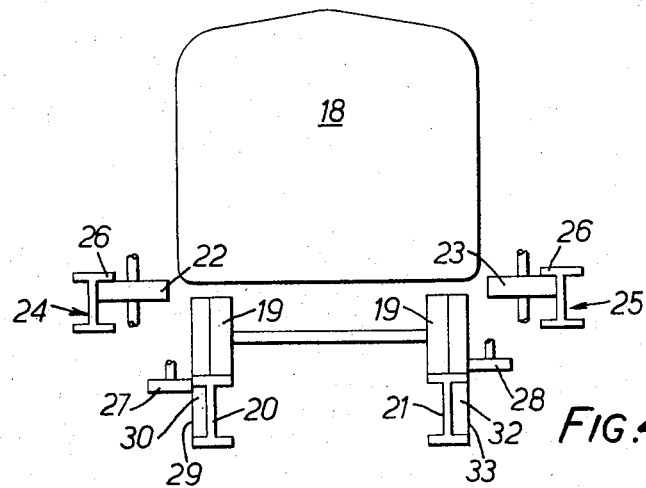
Figure 9:
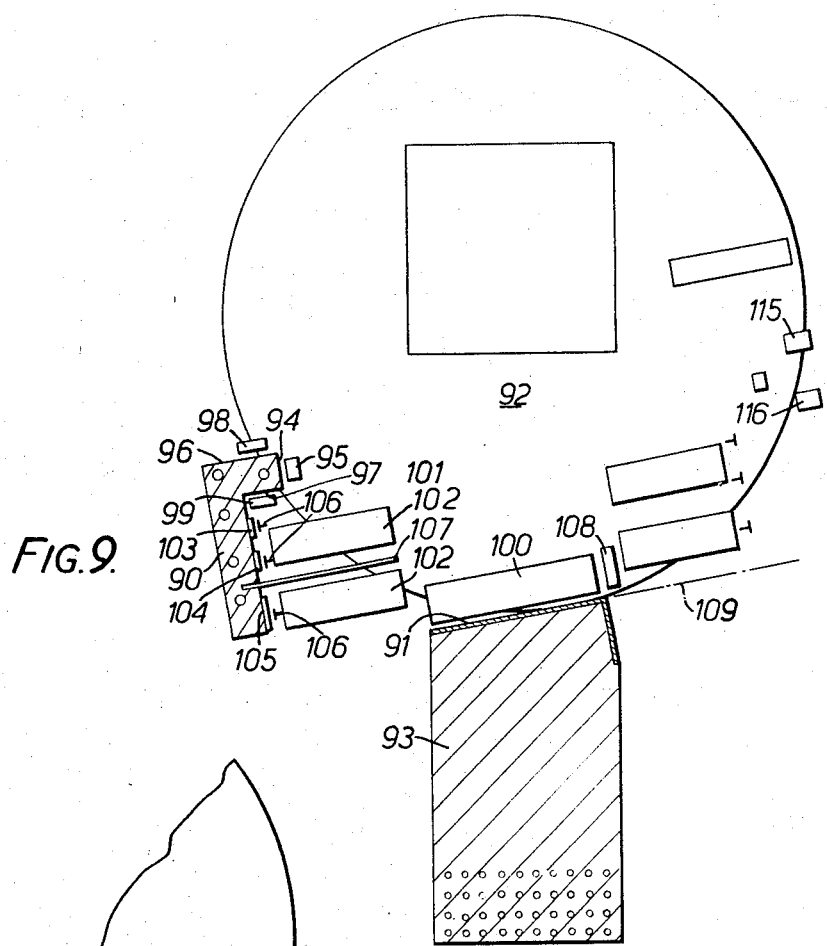
Figure 10:
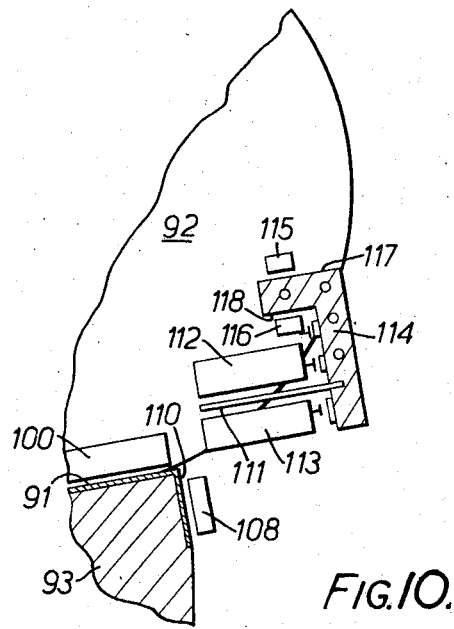
Figure 11:
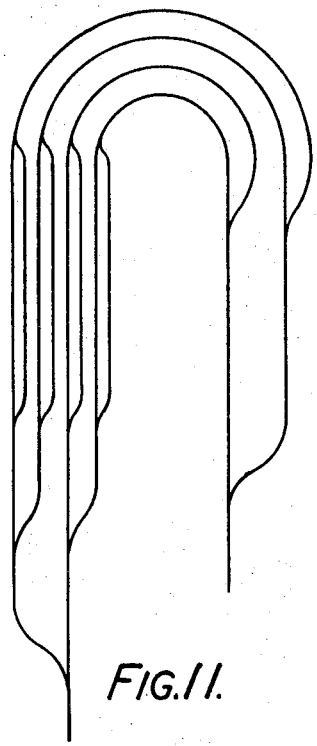
Figure 12:
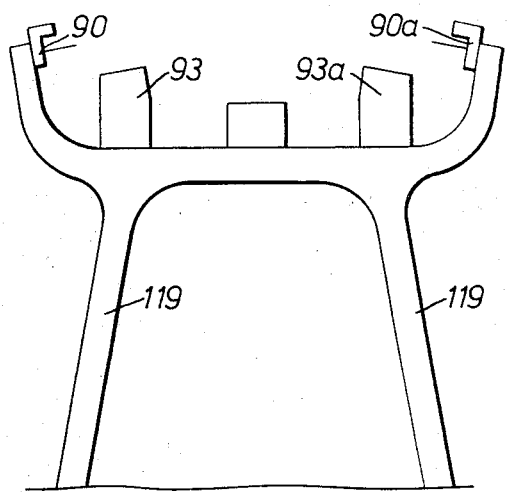
Figure 13:
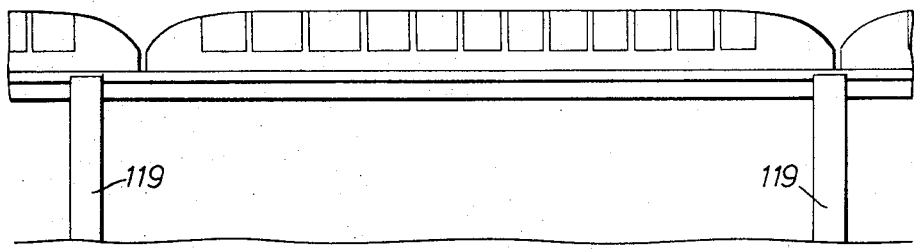
Figure 17:
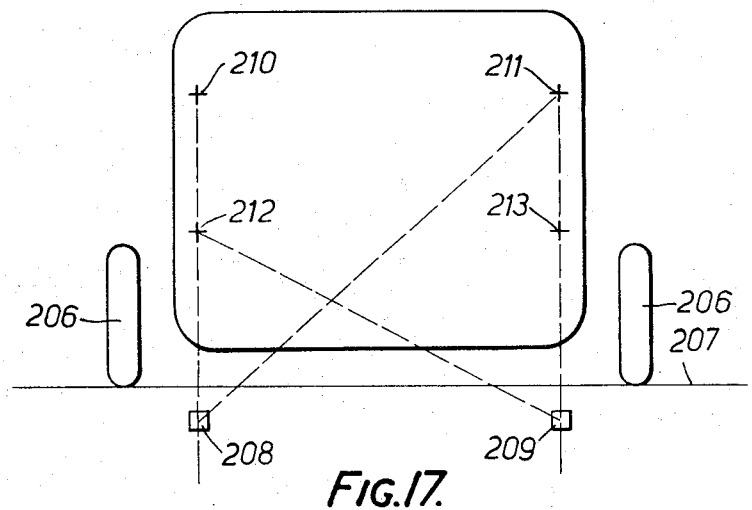
Figure 18:
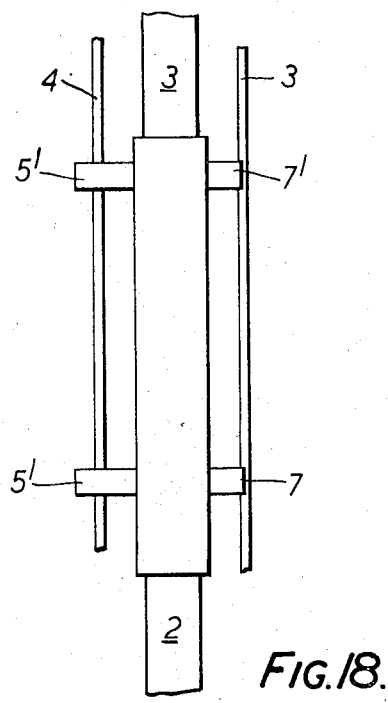

Other objects and features of the present invention will appear more fully below from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims. In the drawings:

FIG. 1 is a somewhat diagrammatic end view of a vehicle and associated track guidance means in accordance with one embodiment, FIG. 2 is a corresponding track plan view, FIG. 3 is a view similar to that of FIG. 1, but of another embodiment, FIG. 4 is a similar view of a further embodiment, FIG. 5 is a fragment of FIG. 4 illustrating one guidance, FIG. 6 is again a similar view of yet another embodiment, FIG. 7 is again a similar view of a yet further embodiment, FIG. 8 is a similar view of an embodiment utilising a linear induction motor for propulsion, FIG. 9 is a lateral sectional view of another embodiment, FIG. 10 is a fragment of the view of FIG. 9, showing an alternative guidance condition, FIG. 11 to 13 illustrate track forms for the embodiment of FIGS. 9 and 10, FIGS. 14 and 16 are lateral sectional views of alternative air cushion bearings for use to support a vehicle according to the invention, FIG. 17 is a lateral sectional view of yet another embodiment, and FIG. 18 is a plan view of the embodiment of FIG. 1.

In the embodiment of FIG. 1 the vehicle 1 is supported by means such as a fluid cushion 2 on a single plane track surface 3. Alternatively, dual trackways may be provided for support wheels (not shown), and propulsion may be by any suitable means, such as wheels, linear induction, or airscrew. For simplicity, means of propulsion are not shown in FIG. 1. Guidance is normally by a side-rail 4, which is engaged by a follower arm member 5 mounted on the vehicle 1.

In some cases the follower arm 5 may control vehicle steering mechanism and, in such cases, a single set of follower equipment, as is being described, will suffice. In order cases, the vehicle is directly located in the transverse direction by the follower equipment and for this purpose the equipment illustrated is duplicated in a transverse section which is removed from the present one. In such cases, motion of the two follower arms 5 is synchronised, so that they both move at the same time. In the region of each track junction as opposite side rail 6 is provided, engageable by a pair of follower arms 7 which are normally in the raised position shown in FIG. 1. The side guide rails 4 and 6 are each shared by duplicated follower arms 5 or 7, this duplication being provided in order to prevent the vehicle 1 yawing about a vertical axis.

Referring to the track plan of FIG. 2, which is on a smaller scale than FIG. 1, the vehicles travel from the bottom towards the top of the drawing. A vehicle programmed to travel straight on at the junction X continues guided by the lefthand guide rail 4. The track-side transmitter 8 transmits the vehicle a simple and ordinary signal in a manner well known, such as by a trip lever, a magnet, or a beam. Upon passing this transmitter, a vehicle-mounted programming unit (not shown) receives this signal and is advanced one step. Such a programming unit may comprise any of those well known in the railroad art, for example, a ticket in the form of a route card, each step of which contains a specific vehicle command either to branch left or to branch right.

If the vehicle is already programmed to branch right, it still uses the lefthand guide rail 4 for its approach and the trackside transmitter 8 again advances the programming unit one step. However, in this case the programming unit causes the follower arm 7 to engage the guide rail 6, and subsequently the follower arm 5 is disengaged from the guide rail 4. The lower break in the FIG. 2 drawing signifies a substantial distance, so that these operations are completed before the branch junction X is reached. The vehicle is then guided to the right, by the guide rail 6, and it continues to be so guided, for the substantial distance which is represented by the upper break in the drawing. Subsequently, a further trackside transmitter 9 advances the programming unit by another step, causing the vehicle to change back to the lefthand guide rail 4. In order to illustrate the advantages of this system, its logical derivation from existing road transportation will now be outlined.

The main advantage of road transportation is individual route selection. By this is meant, the ability of each individual vehcle to choose which way it goes when the road branches. By a succession of such choices, it follows its own selected route, to a specific destination. In order to obtain this advantage, vehicles are given complete freedom of steering, at all times. Amongst the infinite range of choice which is thus provided, driver has continuously to select the required path. Steering is truly of use only when the vehicle is actually choosing between alternative road branches and all other degrees of freedom of steering are, from the fundamental viewpoint, not only redundant but actually harmful.

The feature of the present invention which has been described with particular reference to FIGS. 1 and 2 is referred to, in principle, as track selection Track selection retains the essential freedom of route selection but, at other times, the vehicle is guided by the track, like a railway train. The track or tracks need be no wider than is required to support the vehicle wheels or other support means employed. Rigorous speed control may be imposed, and safeguarded by automation. This decreases the capital cost of track construction and, indirectly, increases its carrying capacity.

An initial application for transportation means according to the invention could be between two points, such as an airport and a city centre. In such a case, automatic terminal control might guide the vehicles into appropriate loop sidings, with automatic approach control fitting the vehicles between one another, at track junctions, as they leave the loop sidings. Speed control would prevent collisions between vehicles which are moving behind one another, on the same track.

At a second stage of development, a plurality of terminals could be served by the same main line. Each vehicle would then be programmed in advance, to select the correct sequence of lefthand and righthand branches in the track. For example, a sequence as "left," "left, right, right, left," would cause the vehicle to branch left at the first branch of the track, corresponding to the first step in its programming unit or ticket, left at the second branch, corresponding to the second step in the vehicle-mounted programming unit described above, and so on. By this means alone, each vehicle would be directed to its prescribed destination.

These developments, and those which are about to be described with particular reference to the remaining drawings, all tend to increase the track carrying capacity, both relative to the area occupied and the loss of urban amenity, and also in relation to the capital cost of track construction. The ultimate level of carrying capacity, of a single track, is very high, and thus it is economic to sacrifice some of this potential capacity in order to reduce vehicle unit size, with consequent advantages relating to the maintenance of urban amenity and cost of track construction.

In order to illustrate the additional advantages which result from further development, the logical derivation of this system from existing rail transportation will now be outlined. The main advantage of rail transportation is carrying capacity, both relative to the space occupied by the track and to the cost of track construction. The main disadvantage is that it has to use large trains, between large terminals and/or intermediate stations, i.e., there is a lack of route choice flexibility. The carrying capacity is obtained by vehicle guidance. However, this capacity is restricted by the need for block control, which necessitates large stretches of unused track, between each section which is actually in use, beneath the wheels of a passing train. In order to minimize this waste of space, long trains are used, thereby increasing the ratio of track used to track wasted. Long trains impose the ultimate limit on carrying capacity, by their requirement for terminal facilities, they also destroy the route choice flexibility which is an important passenger requirement.

By transferring the route-selection faculty from a trackside signal box to each individual vehicle concerned, track selection goes a long way towards eliminating the need for block control. It is proposed to complete this elimination, in a system of transportation according to the present invention, by the use of automation in conjunction with improved vehicle braking. Not only does this enable vehicles to run closer together, but it eases the terminal bottleneck. This is because vehicles which are travelling close behind one another can be directed into separate loop sidings, which are off the main track. Thus a plurality of smaller and more conveniently situated terminals becomes available. In terms of long-term development potential, the number of secondary tracks which feed a main line increases. As main line traffic density progressively increases, the aim is to form groups of independent vehicles which maintain light end-to-end contact with one another. Vehicle mounted automatic speed control is provided, to cause vehicles running close together to establish this end-to-end contact without shock. In order to avoid instability, and to minimise the number of trains so formed, speed control preferably either always speeds up a following vehicle, to contact the one in front, or vice versa. Such trains can be longer than customary railway trains, because they escape the limits imposed by starting and stopping facilities. At branches they separate out, and proceed to their separate destinations. Provided that gaps so formed are reasonably small, they are subsequently automatically closed up again.

A secondary advantage which results from forming groups in the foregoing manner is that it eliminates the problems associated with collective stability between vehicles running close together, but not in contact. The limit to a main line carrying capacity is no longer terminal facilities, together with train length, but the acceptable waiting time while one train is waiting to enter a section of main line, behind a previous one which is passing. While a train is waiting, other vehicles may arive at the rear and establish contact with it. At the right time, they are started by computer, so as to follow the train which has just passed. By the elimination of block control and by the use of long trains of vehicles in light end-to-end contact, the ultimate limit of carrying capacity is very high indeed. The following description applies to a design study proposing a system utilising very light individual vehicles.

The proposed system will carry in the order of 20 times as many passengers per hour as a double three-lane motorway, yet its track is only one sixth of the corresponding width while only one half of the corresponding clearance height above the track is required. Small and light driverless vehicles are individually programmed in advance, so that each follows its own independent route, even over the most complex track network, without the need to reduce speed. Urban terminals are situated actually inside the larger buildings, in order to reduce rush hour street congenstion, and suburban terminals are adjacent car parks chosen for road access.

Various alternative embodiments of the track selection principle will now be described. In respect of features not individually specified, these generally resemble those already described with particular reference to FIGS. 1 and 2.

FIG. 3 of the drawings illustrates a transverse section through a vehicle 10 designed for factory goods distribution, which is a possible initial application with low development costs. The vehicle is in the form of a truck which runs on wheels 12 over factory floor 13. It is guided either by a follower member 14 engaging a floor slot 15, as shown, or by a follower 16 engaging a floor slot 17. A programming unit selects the appropriate channel follower 14 or 16 at each branch or junction, to route the truck to its required destination.

FIGS. 4 and 5 illustrate one application of the invention to the Westinghouse so-called "transit expressway." The vehicle 18 is supported on double pneumatic-tired wheels 19 which run on spaced track members 20 and 21. Transverse guidance is provided by two horizontal wheels 22 and 23 with vertical axes of rotation, which engage channel members 24 and 25 beneath the top webs 26 of which the wheels 22 and 23 engage with a keying effect in order to prevent all possibility of the vehicle overturning. In the existing system the track is without branches, or junctions, in the normal sense and the wheels 22 and 23 engage a single central channel member below the vehicle — thus if it is desired to move the vehicle 18 on to another track it is stopped on a section of track which is slidable transversely and the vehicle and track section moved bodily to realign with second track. This is inconvenient for operation at high traffic densities, because the main line is out of action while a vehicle is being transferred.

The application of track selection to this system is illustrated in FIG. 4 which represents the condition for all occasions except branching to the right and junctions from the right. The use of outwardly spaced guide members 24 and 25 above the track members 20 and 21 results in much increased stability as well as providing for track selection, and supplementary vehicle-mounted horizontal guide wheels 27 and 28 can be raised or lowered along their vertical axes. The wheel 27 is shown lowered in FIG. 4, to engage a vertical track side face 29 which, in this case, is provided by a filling piece 30 in the corresponding main track member 20. A similar filling piece 32 in the other track member 21 provides a side face 33.

At a track branch the members 24 and 25 separate, the vehicle 18 being guided by wheels 22 and 27, with the wheel 25 temporarily disengaging the side member 25. FIG. 5 shows the corresponding operating position for right-hand branches, or for junctions from the right. The wheel 27 is raised, and the wheel 28 is lowered. When the members 24 and 25 separate, the wheel 22 is temporarily disengaged from the member 24 and the vehicle 28 is guided by the wheels 23 and 28.

In FIG. 6 there is illustrated the application of the invention to the Brush Electrical so-called "automatic self-routing taxi system." The vehicle 40 is supported on pneumatic-tired wheels 41 which run inside a single channel-shaped track 42, as compared with the spaced twin tracks of the existing proposal in which automobile-type steering is provided and controlled by an electric pick-up arm which engages an overhead guide track. On approaching a branch, this pick-up arm is given a bias to whichever side of the branch the vehicle is to follow and there is the considerable disadvantage that the arm is affected by vehicle rolling motion, and thus the system has limited margins of robustness, stability and safety.

In the present application of track selection, additional horizontal wheels 43 and 44 follow surfaces of curb members 45 and 46 which are perpendicular to main track surface and in effect form side webs of the track member 42. These wheels 43 and 44 may be preloaded in order to maintain contact at all times, with one or other wheel used for steering.

According to one construction, the steering wheel is linked to servo-mechanism, which governs the vehicle steering. Said servo-mechanism maintains a nominal datum position of the vertical axis of rotation of the wheel 43 or 44 concerned, relative to the vehicle 40. According to another construction, the wheels 43 and 44 are connected with servo-mechanism which operates to maintain pressure with whichever curb member 45 or 46 is being used for guidance.

According to yet another construction, the servo-mechanism is omitted, and the vehicle steers to maintain pressure with the appropriate curb member 45 and 46, and such pressure is limited by vehicle steering characteristics, e.g., castor action, or by placing horizontal wheels in front of the vehicle wheels carrying the weight, so that contact with the curb produces a correcting couple. The curb members 45 and 46 temporarily separate at branches and junctions, and the vehicle is then guided by the lefthand curb member 45, for lefthand branches and junctions, and by the righthand curb member 46 for righthand branches and junction.

An embodiment of the invention with certain advantages, especially for outdoor vehicular transportation, is illustrated in FIG. 7. The vehicle 50 runs on pneumatic-tired road wheels 51 and 52 over plane surfaced tracks 53 and 54, the surfaces 55 and 56 of which lie on the same transverse straight line and are inclined to the horizontal. The axis of rotation of the wheels 51 and 52 is parallel to the main track surface 55 and 56. FIG. 7 represents conditions for lefthand branches and junctions and between branches and junctions. A vehicle mounted wheel 57 has an axis of rotation which is perpendicular to main track surfaces, and it engages a perpendicular track guide surface 58 on a side guide member 59.

A further vehicle mounted guide wheel 60 has an axis of rotation perpendicular to the main track surfaces, and it can be lowered along its axis of rotation to engage a perpendicular guide surface 61 formed on the track member 54. This is the position for righthand branches and junctions from the right, and the wheel 57 temporarily disengages from the guide track surface 58 under those conditions. It will be noted that there is no mean side-thrust on the wheels 51 and 52, because any such thrust would result in transverse dift of the vehicle 50 and thus re-establish equilibrium.

At junctions and branches, each has a section of main track surface which is shared by the wheels 52, of vehicles branching or joining to or from the left, and by wheels 51 of vehicles branching or joining to or from the right. Thus the track members 53 and 54 have surfaces lying in the same transverse line.

Advantages of this system are that the inclination of the track surface 55 and 56 provides a reaction force upon the vehicle 50, which locates it transversely against side guide track surface 58. Thus the need for a second similar surface on the other side is eliminated. Another advantage is that stones, snow and the like slide off the track, and it is less likely that pedestrians will walk upon it. It also provides the opportunity to ensure fail-safe vehicle removal to the left, at any branch.

FIG. 8 illustrates the application of track-selection to a vehicle 70 of the type known as a "tracked Hovercraft," with propulsion by linear induction. A corresponding form would suit the Bertin so-called "aerotrain." The vehicle 70 rides on air cushions 71 and 72 above a trackway 73 the upper track surface 74 of which is inclined to the horizontal at about 15 degrees, for the same reasons as with the wheeled embodiment of FIG. 7. The drawing shows conditions for lefthand branches and junctions. Transverse location is provided by a vehicle located air cushion member 75 which slides on a side guide track 76 the guide surface 77 of which is generally perpendicular to the main track surface 74. An alternative vehicle-mounted air cushion member 78 is provided with means for lowering, to engage the perpendicular track side guide surface 79, and it is so lowered for righthand branches and junctions when the cushion member 75 is temporarily disengaged from the guide track 76. Conductor strips 80 and 81 are provided for propulsion by linear induction, and they are parallel to the main track surface 74 and each suitably supported at its outer extremity. At branches and junctions, the distance between the conductor strips 80 and 81 is temporarily increased and the vehicle is then propelled, as appropriate, by only one strip with the other strip sliding transversely from the gap between the magnets concerned. This avoids the need for articulated magnets for linear induction.

The embodiment shown in FIGS. 9 and 10 is a development of that of FIG. 8 which is especially suitable for fluid cushion slipper bearings designed to operate at higher pressures than are usually employed for Hovercraft. It is also suitable for use where the slipper bearings, which are described by way of example, are replaced by wheels. Increased slipper bearing pressures reduces the track surface width requirement and economic and aesthetic considerations then demand use of a reduced track width. The reduced track width tends adversely to affect rolling stability, and according to this embodiment the side guide track member 90 is removed from main track surface 91 by a transverse distance sufficient to provide a satisfactory lever arm for adequate rolling stability. It is provided with one or two slipway surfaces suitably angled to ensure rolling stability, i.e., with a component of area which is sufficient for the purpose and perpendicular to the local direction of motion in rolling.

The body of the vehicle 92 is a circular member, and the weight is carried by the inclined resin-faced slipway surface 91 on a factory-produced and prestressed concrete beam member 93. The side track member 90 provides a slipway surface 94 perpendicular to main slipway surface 91 and engageable by a fluid cushion slipper bearing 95. It also comprises opposed slipway surface 96 and 97 parallel to the main slipway surface, and engageable by fluid cushion slipper bearings 98 and 99 which provide rolling stability while the bearing 95 provides transverse location. Duplicated equipment, similar to that just described, provides stability in respect to yawing about a vertical axis.

FIG. 9 shows the condition between junctions and branches, and for lefthand branches and junctions. The slipper bearing 95 is pre-loaded by a component of reaction from the main slipway surface 91 which is engaged by the vehicle support slipper 100 and acts to the left. Propulsion is by linear induction, utilising vehicle-mounted electromagnets 101 and 102, which are energized through track-mounted conductor strips, 103, 104 and 105. Suitable vehicle-mounted electrical pickups are provided, as shown diagrammatically at 106, and the propulsion conductor strip 107 is parallel to main slipway surface 91. An additional fluid cushion slipper bearing 108 is provided, with means for rotation about an axis 109, and is shown in the raised position.

The conditions for righthand branches and junctions are shown in FIG. 10. The fluid cushion slipper bearing 108 is lowered to engage the side slipway surface 110, which is perpendicular to the main slipway surface 91, and to the direction in which slipper bearing 108 is movable. Vehicle transverse location is then by the slipper bearing 108 opposed by a transverse component of reaction from the main slipway surface 91. A second linear induction conductor strip 111 is engaged, and this is also parallel to the main slipway surface 91. Electromagnets for linear induction are duplicated at 112 and 113, as are the conductor strips and associated electrical pickups. Rolling stability is still provided by the righthand side track 114, through slipper bearings 115 and 116 which art upon opposed slipway surface 117 and 118, again both parallel to the main surface 91.

At junctions and branches the two side tracks 90 and 114, together with the linear induction equipment, are separated, in the same way as already described for the embodiment of FIG. 8. Not only are the linear induction strips 107 and 111 disengaged, without introducing articulated parts, but the slipper bearings provided for stability in rolling, and for transverse location, are similarly disengaged without articulation. The only articulated part is the subsidiary slipper bearing 108.

FIGS. 11 and 13 illustrate diagrammatically track forms suitably used. Referring particularly to FIGS. 12, which is a lateral section through a length of an overhead twin-track system, the lefthand track member is inclined to the left as in FIGS. 9 and 10 and the transverse reaction is normally sustained by the side guide member 90. The righthand track member 93a is oppositely inclined, i.e. to the right, and the transverse reaction is sustained by the guide member 90a on that side. The complete track is supported on columns 119, which allow for free normal traffic below the track.

The invention is also concerned with the provision of suitable fluid slipper bearings for a transporation vehicle. It has been proposed that air from a pressure vessel should penetrate a porous resistor to produce a stable air film over a compliant (elastomer) faced track. Disadvantages of this proposal are that the track requires a coating of the elastomer, which will normally be adversely affected by sunlight and cannot be repaired without putting the track completely out of action. In addition, the porous resistor tends to become blocked, because the pore passages must be small relative to the air film thickness in order to ensure stable film and blockage ruptures the air film, with resultant track damage. For these reasons, it is preferable to transfer the compliant function to the porous resistor itself. However, in its simple form, this is wrong in principle as the pressure differential merely forces the resistor against track surface, sealing it.

Figure 14:
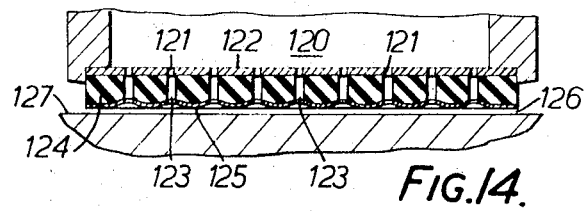

FIG. 14 shows a solution which is provided by the present invention. Air, in an enclosed space 120, penetrates metering holes 121 which are provided in a rigid metering plate 122. Air then passes through low resistance holes 123 in a compliant member 124 which is of a material such as a sponge rubber. Beneath the compliant member 124 there is a dimpled semi-compliant facing member 125. This is of a material, preferably, which not only has the required stiffness characteristics but also has self-lubricating and bedding properties, such as pure polytetrafluorethylene (P.T.F.E.). The passages 123 communicate with the dimples in the facing member 125, which dimples act as ordinary aerostatic bearings to ensure a relatively thick and stable air film at 126 between the slipper bearing and a relatively smooth slipway face 127.

The compliance of the slipper bearing is sufficient to accommodate minor irregularities in the slipway surface 127 but it is at the same time sufficiently stiff to prevent air film rupture at positions between the dimples of the facing member 125. This property is important, both when crossing irregularities in the track surface, and in the case of local zones of film instability which may be created by aerodynamic influences.

According to the invention, a slipper bearing such as that just described may be provided with means for pivoting, so that it can act as an ordinary pivoting thrust bearing when its rubbing speed is sufficient. According to another feature of the invention, such a slipper bearing is used to provide supplementary air film lubrication beneath the primary seal of an air slipper bearing of the type now to be described with particular reference to FIG. 15. It may help starting and/or supplement the hydrodynamic film locally.

FIG. 15 illustrates a type of fluid cushion slipper bearing which could be used as a vehicle suspension unit. A soft-backed, and P.T.F.E. faced sealing ring 130 slides on a resin-faced concrete slipway member 131. A load carrying member (for example a vehicle) 132 is supported on a fluid cushion at 133. The ring 131 provides a primary seal and leakage is prevented by secondary sealing ring 134, which slides on the primary sealing ring 130 had enough flexibility to accommodate slight ovality, so that the primary seal can pivot, advance or retreat.

A continuous fluid film is provided beneath the primary seal, and pressure in this film graduates from that inside the seal to that outside. The film provides a net upward force on the primary seal which is hydrostatically balanced by the full interior pressure acting upon the interior surface of the facing ring of primary seal, in conjunction with the exterior pressure acting on outside of seal, and springs (not shown) are provided to ensure initial sealing.

Approximate operating conditions are as follows:
Cushion pressure, 7p.s.i.
Mean net loading of primary seal on slipway, 0.02 p.s.i.
Mean clearance 135 beneath primary seal, 0.003 inch.

It is the clearance 135 which may be stabilized by the use of the described feature incorporating the semi-resilient and dimpled facing member 125. Experience with liquid bearings of this type has shown that, under favourable conditions, a hydrodynamic wedge developes between the primary seal and the slipway surface, so that the fluid cushion become self-pressurising. A theoretical analysis is backed up by enough testing to show that it is possible to ensure that the net pressure of the primary seal, upon the slipway, is of the low order stated. This reduces the air film lubricating requirement.

FIG. 16 illusrates a developed form of fluid cushion support unit, in accordance with the invention, which is generally circular about an axis 140. At the bottom, a concrete track 141 comprises a resin-faced slipway 142 upon which slides the specially balanced sealing ring assembly or "primary seal" 143. The bottom of the vehicle is at the top of the drawing, and is represented by 144. The load is carried by a plug member 145, which fits a recess in the bottom of the vehicle and is prevented from turning by a hollow dowel 146, which is not in the plane of the section.

Trapped beneath the outer assembly 143 is the cushion of air which supports the weight of the vehicle and provides resilience. The air pressure is of the order of 5 to 10 p.s.i. The centre part of this cushion at 147 is more or less disc shaped; the outer part is a hydrostatic balance chamber 148. These two spaces freely intercommunicate. The space between the periphery of the outer plug member and the cylindrical part of the primary seal, is closed by special flexible secondary seal assembly 149. When the vehicle is in motion, the air cushion space is pressurised hydrodynamically by the sliding of the primary seal ring on the slipway. Pressure being generated by the same mechanism as that for a tilting pad thrust bearing. Excess air which is generated in this way is released through a balanced nylon spool valve 150 to an exhaust belt 151 which communicates with the atmosphere. When the vehicle is at rest the cushion is pressurised through an induction belt 152, which is piped to a compressor discharge through the hollow dowel 146, the compressure being inside the vehicle. At intermediate speeds a transitory regime exists conductive to lubrication failure to those sections of the sealing ring which are situated at specific known angles from the leading centre line. In order to prevent this, should it prove serious, hydrostatic pockets are provided, one of which is shown displaced at 153. The primary seal assembly is free to advance, retract or tilt in relation to the plug member 145. Its surface loading, where it bears upon the slipway, is governed by the projected area of the hydrostatic balance chamber 144. On initial pressurisation, sealing is ensured by springs 154.

The primary seal assembly 143 comprises a plastics ring member, with an internally machined cylindrical surface and a flat ring portion 157. The backing cushion 158, of plastics or rubber foam, allows the tyre bearing surface to accommodate small irregularities in the track surface 142. A radial pressure gradient exists across the bearing surface of the primary seal and the resultant tyre load must be matched by uniform compression of the backing cushion, without distortion of the mating surface from a true plane.

In the secondary seal assembly 149, a ring 160 of pure P.T.F.E. is preloaded by a chamfered loading ring and the compression springs 154 which are retained by a cage 162. The central plug assembly comprises the secured plastic plug 145 and an outer plug member 163 seating at 164 and 165. An O ring 166 provides a seal, and a asymmetrical bulge houses the valve 150. A passage 167 restricts air flow to the interior of the plug assembly. Depression of the vehicle 144 induces air, and the equivalent spring stiffness depends on the plug interior volume with the damping governed by the size of the passage 167. In an emergency the vehicle can start without the compressor operating, and to reduce track scoring and starting friction a plug tyre 168 of P.T.F.E. is fitted. To prevent this tyre dropping, a space behind it is vented by a radial groove 169 and vent 170.

To refer again to FIG. 6, line A — A' shows the axis of rotation of the wheel 43. Said wheel may be provided with a second pair of bearings, corresponding to the king-pin of an automobile, whereby the wheel bearings may pivot, about an axis B — B', causing the axis of rotation of the wheel so to pivot. By this means, caster action may be provided, to eliminate a source of wear which would otherwise be produced by the vertical bouncing of the vehicle, due to irregularities of the main track surface. Similarly, such caster action may be provided for the wheel 44, and, in order to eliminate corresponding wear due to irregularities in the curb members, wheels 41 may be provided with similar caster action, the axes of rotation being themselves pivotable about axes B — B', in each case. Similarly, with regard to FIG. 7, one axis A — A', one axis B — B' and two axes C — C' are shown. These correspond to the axis so named, in FIG. 6.

To refer again to FIG. 3, the wheels 12 may with advantage be placed inside members 14 and 16, as shown by 12'. By this means, the wheels do not have to cross the grooves 15 and 17.

Referring now to FIGS. 15, a hydrodynamic wedge is formed at 201 between the primary seal and the slipway, by means of which the bearing is self-pressurized. Arrow 202 shows the direction of motion. An optional duct 203 enables the bearing to be externally pressurised, by a pump or compressor. This is of use for starting, and other circumstances when the self-pressurising mechanism is insufficient.

With reference to FIG. 16, the pocket 153 illustrates the application to this embodiment of the principle shown in FIG. 14. If desired, a large part, or the whole of tyre surface 159 may be provided with dimples; the pocket 153 corresponds to a dimple of FIG. 14. In addition, if desired, the tyre surface 153 may be a disc, not a ring. That is to say, the central hole may be omitted, the whole area being constructed to resemble FIG. 14. The advantage of this latter modification is that, because the semi-compliant tyre surface is in effect supported on a plurality of hydrostatic dimples, a crack in the surface of the slipway or track, such as may normally be present at joints provided for thermal expansion, will not rob the unit of an excessive proportion of its carrying capacity.

The limit flange 204 is rigidly joined, in this case, by an interference fit to the primary seal. Excessive air, or liquid, causes the outwardly projecting flange of the plug member to engage this limit flange. This causes the primary seal to be separated from the slipway surface, bleeding away excess air or liquid. This is an alternative or supplement to the valve 150. Its advantage is that it may limit, or accurately locate, the plug member, relative to the slipway, in a direction perpendicular to the slipway surface. To obtain location, without the valve 150, an external flow restrictor may be fitted in the duct by which the bearing is externally pressurised.

With regard to the embodiment shown in FIGS. 15 and 16, it is emphasised that pressures are given only by way of example. In any particular case, pressures widely different from those described may be used. This is particular the case should a liquid, such as oil or water, be used instead of air. In this case, a means is provided, such as a sprayer, to introduce the liquid to the leading edge of the bearing, or to pressurise it from an external pump. The advantage of a liquid is that pressures of a higher order may be used, with correspondingly increased carrying capacity.

FIG. 17 shows an embodiment wherein a vehicle 205 is supported by wheels 206 above a track 207. Magnetic elements 208 and 209 are embedded in the track. Follower members are provided by vehicle-mounted sensing elements, which operate in pairs, 210, 211 on the guide member 208, and/or 212, 213, on the guide member 209.

FIG. 18 is plan view of the embodiment shown in elevation in FIG. 1. Vehicle 1 rides track 3, already described in this particular case, it is provided with two pairs of follower members, 5,5' and 7,7' which operate on the alternative guide members 4 and 6.

I claim:

1. Means of transportation comprising a vehicle, a track having a selective branching zone and at least two alternative branching routes for the vehicle, at least two alternative guidance means for the vehicle, each guidance means comprising at least two permanently stationary guide surfaces extending continuously along the track, through the branching zone parallel to the same one of said branching routes an one of which said surfaces is inwardly facing, two vehicle-mounted primary followers individually associated and respectively engageable with the inwardly facing guide surfaces of the guidance means, and at least one vehicle-mounted secondary follower disposed closer to the longitudinal center line of the vehicle than said inwardly facing guide surfaces and operable upon the other of said surfaces in such manner that the vehicle may be selectively constrained transversely of the track to cause the selected primary follower to follow the engaged guide surface and thus lead the vehicle into the selected branching route with disengagement of the other primary follower from the associated guide surface being achieved solely as a result of the transverse relative movement of the vehicle away from that guide surface.

2. Means of transportation according to claim 1, wherein said other of said guide surfaces is the surface of the track on which the vehicle is supported.

3. Means of transportation according to claim 1, wherein said other of said guide surfaces of each guidance means is outwardly facing and is closer to the center line of the vehicle than is each of the inwardly facing guide surfaces.

4. Means of transportation according to claim 3, wherein each guidance means comprises at least three permanently stationary guide surfaces engageable by at least three vehicle-mounted followers at least two of which followers are individually associated with respective ones of said guide surfaces, and by means of the engagement of which followers with such guide surfaces a couple is produced which acts upon said vehicle to counteract the rolling couple resultant from a change of direction due to said branch in the vehicle route.

5. Means of transportation according to claim 1, wherein both of said inwardly facing guide surfaces are above the level of the track at which the weight of the vehicle is supported.

6. Means of transportation according to claim 5, wherein said secondary follower comprises a wheel on which the weight of the vehicle is partially supported on the track, which wheel has means for steering in order to maintain contact between the selected primary follower and the inwardly facing guide surface engaged thereby.

7. Means of transportaton according to claim 6, wherein contact between the primary follower selected and the associated inwardly facing guide surface engaged is maintained by pressure resulting from the vehicle steering, which pressure is limited by steering castor action.

8. Means of transportation according to claim 1, wherein said two guide surfaces of each guidance means are respective provided by two permanently stationary guides.

9. Means of transportation according to claim 8, wherein at least one of the stationary guides presenting said inwardly facing guide surfaces has an inwardly extending flange engageable by a surface associated with the corresponding primary follower whereby the latter is restrained from lifting in order to retain the vehicle on the track, from which flange the follower-associated surface is disengaged at the track branch solely as a result of the transverse relative movement of the follower concerned away from the guide surface engaged.

10. Means of transportation according to claim 1, wherein said vehicle is propelled by linear induction means, and the linear induction means comprise a permanently stationary conductor strip which branches to follow the separate branching track routes and which has an operative surface parallel to the surface of the track, and a vehicle-mounted linear motor with magnet assemblies permanently stationary relative to the vehicle, which magnet assemblies at the track branch move transversely over the operative surface of the conductor strip so as to leave the branch of the strip following the track route not selected and to follow the strip branch following the selected route.

* * * * *